March 17, 1925.                    J. R. CHARLES                    1,530,351
HEADLIGHT INDICATOR
Filed Feb. 17, 1923
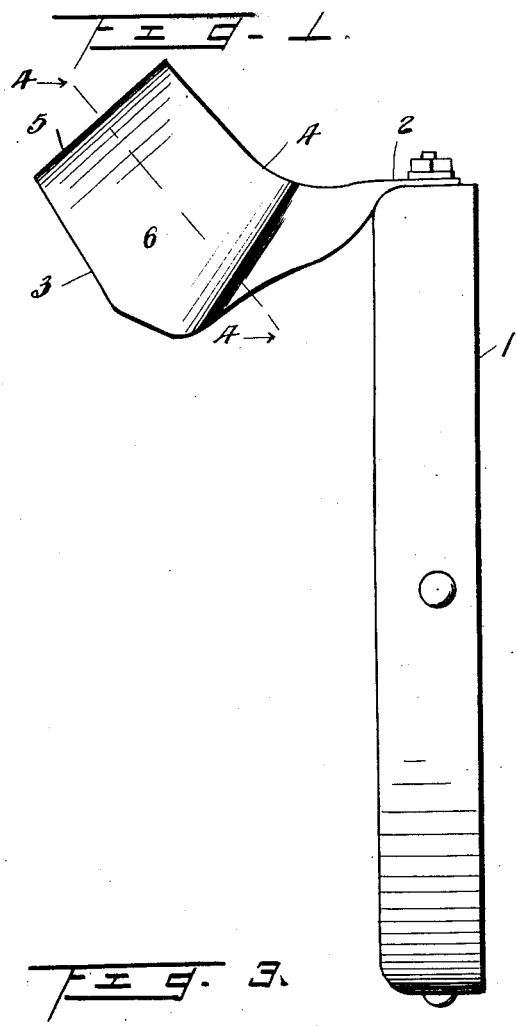
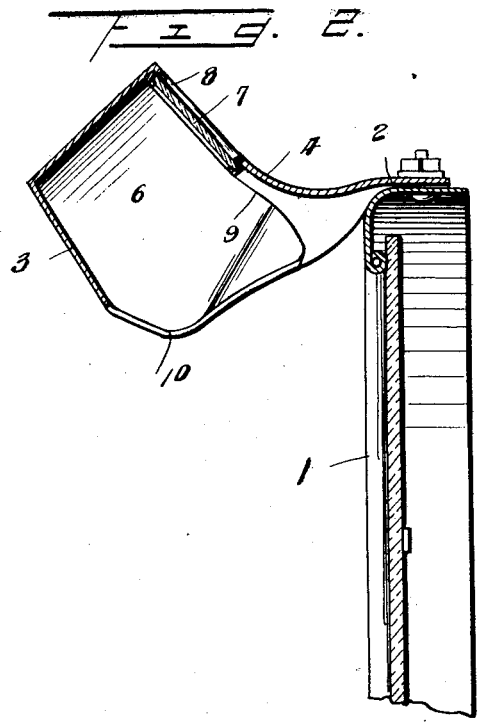
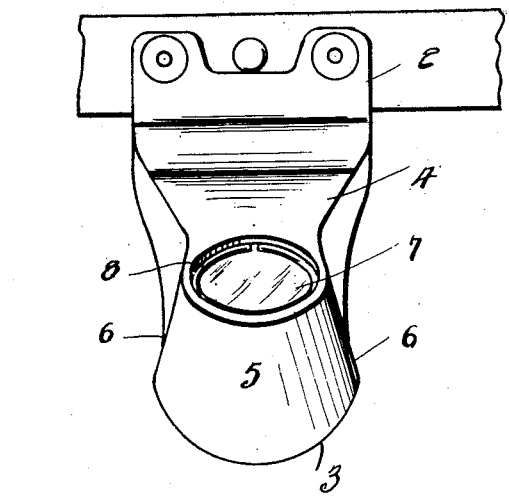
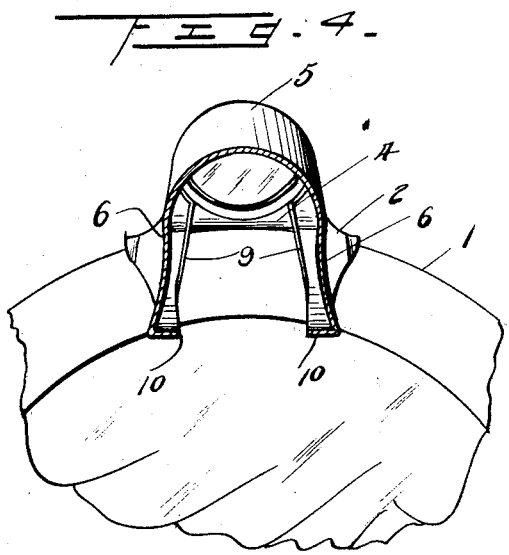
Inventor
J. R. Charles.
By *A. Randulph Jr.*
Attorney Patented Mar. 17, 1925.

1,530,351

UNITED STATES PATENT OFFICE.

JOHN R. CHARLES, OF VENICE, CALIFORNIA, ASSIGNOR OF ONE-HALF TO NOE BRODSKY, OF VENICE, CALIFORNIA.

HEADLIGHT INDICATOR.

Application filed February 17, 1923. Serial No. 619,673.

*To all whom it may concern:*

Be it known that I, JOHN R. CHARLES, a citizen of the United States, residing at Venice, in the county of Los Angeles and State of California, have invented certain new and useful Improvements in Headlight Indicators; and I do hereby declare the following to be a full, clear, and exact description of the invention, such as will enable others skilled in the art to which it appertains to make and use the same.

The driver or occupant of an automobile cannot determine at all times and under all conditions whether the headlight is functioning properly after dark when presumably it should be lighted.

The present invention provides indicating means which shows a light to the rear when the headilght is lighted so that the driver may be advised at all times and opportunity afforded to remedy the difficulty when the headlight is out, when it should be lighted.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of the lens-retaining rim of a headlight provided with an indicator embodying the invention, Figure 2 is a top plan view thereof, Figure 3 is a section on the line 3—3 of Figure 2, and Figure 4 is a section on the line 4—4 of Figure 1, looking to the rear as designated by the arrows.

Corresponding and like parts are referred to in the following description and designated in the several views of the drawings by like reference characters.

The numeral 1 designates the usual retaining rim whereby the lens of a headlight is held to the casing or body of a headlight. In accordance with the present invention, the indicator is bolted or otherwise detachably connected to the upper portion of the rim 1 and is disposed forwardly thereof so as not to interfere with the primary functioning of the headlight, while at the same time throwing rays of light rearwardly, whereby the driver of the automobile may be advised when the headlight is not lighted when it should be burning.

The indicator comprises a casing formed with a rear extension 2 which overlaps the top of the rim 1 and is bolted or otherwise detachably connected thereto. The construction is such as to admit of the indicator being applied to any make or type of headlight generally provided for automobiles and analogous vehicles. The casing embodies a front wall 3, a rear wall 4, a curved top 5 and side walls 6. The front and rear walls have an upward and forward inclination relative to the attaching extension 2 and the inner side of the front wall 3 is polished to constitute a reflector. A round opening is formed in the upper portion of the rear wall 4 and receives a lens or translucent plate 7 which is held in place by means of a spring retainer 8, in a manner well understood in the art. The rear wall 4 is strengthened and reinforced by forwardly disposed flanges 9 and the side walls 6 are similarly strengthened by inwardly disposed lateral flanges 10. The lower side of the casing is open to receive rays of light from the headlight when the same is lighted, and certain rays of light are reflected from the inner side of the front wall 3 and pass through the lens or plate 7 and are readily observable by the driver who is thus informed as to the functioning of the headlight, whereby trouble may be remedied when the headlight is out and should be lighted.

What is claimed is:

A headlight indicator having a casing provided with a relatively wide rear extension for attachment to a headlight adjacent its top, said casing having an inclined rear wall provided with an opening therethrough, said wall rising from said extension, said casing having a front wall spaced from the rear wall and inclined substantially similarly thereto, the casing being open in the rear of the front wall and for a substantial distance forwardly of its rear end, said front wall extending below the rear wall whereby it will receive and reflect light rays in a material volume directly through said opening, the casing being forwardly flared with respect to the said opening, and the sides of the casing being dished to coact in the production of the flare and in the general reinforcement of the casing.

In testimony whereof I affix my signature in presence of two witnesses.

JOHN R. CHARLES.

Witnesses:
 MABEL L. PUPILLO,
 LAURA C. DORAN.